(12) United States Patent
Moritz et al.

(10) Patent No.: US 10,815,347 B2
(45) Date of Patent: Oct. 27, 2020

(54) BLUSH-RESISTANT FILM INCLUDING PIGMENTS

(71) Applicant: Toray Plastics (America), Inc., North Kingstown, RI (US)

(72) Inventors: Jan Moritz, Bristol, RI (US); Robert Ervolino, Foster, RI (US); Takafumi Sakai, East Greenwich, RI (US); Stefanos Sakellarides, East Greenwich, RI (US)

(73) Assignee: Toray Plastics (America), Inc., North Kingstown, RI (US)

( * ) Notice: Subject to any disclaimer, the term of this patent is extended or adjusted under 35 U.S.C. 154(b) by 618 days.

(21) Appl. No.: 15/445,430

(22) Filed: Feb. 28, 2017

(65) Prior Publication Data

US 2018/0044490 A1 Feb. 15, 2018

Related U.S. Application Data

(60) Provisional application No. 62/373,566, filed on Aug. 11, 2016.

(51) Int. Cl.
*C08J 5/18* (2006.01)
*B32B 15/09* (2006.01)
(Continued)

(52) U.S. Cl.
CPC ............. *C08J 5/18* (2013.01); *B32B 15/09* (2013.01); *B32B 27/08* (2013.01); *B32B 27/20* (2013.01); *B32B 27/36* (2013.01); *B65B 5/02* (2013.01); *B65B 7/16* (2013.01); *B65D 1/12* (2013.01); *C08L 67/02* (2013.01); *B32B 27/18* (2013.01);
(Continued)

(58) Field of Classification Search
None
See application file for complete search history.

(56) References Cited

U.S. PATENT DOCUMENTS 4,167,423 A * 9/1979 Williams .................. C08K 9/02
106/431
4,203,764 A * 5/1980 Tosaka .................. G03G 5/0211
430/533

(Continued)

FOREIGN PATENT DOCUMENTS

EP 1186633 A2 3/2002
JP 59-049268 A * 3/1984
(Continued)

OTHER PUBLICATIONS

Xanthos, Marino. "Functional Fillers for Plastics, Second Edition" Wiley-VCH. pp. 63-139. (2010) (Year: 2010).*
(Continued)

*Primary Examiner* — Vivian Chen
(74) *Attorney, Agent, or Firm* — Nixon Peabody LLP

(57) ABSTRACT

Biaxially oriented film and metal laminate composite thereof useful for manufacturing food containers with good resistance to blushing during steam sterilization, comprising a blend of PBT and PET and also incorporating color pigment comprising polar functional groups. The films possess improve resistance to trans-esterification during melt processing, resulting in enhanced crystallinity levels present in the laminated film which leads to little or no blush discoloration during steam sterilization.

7 Claims, 1 Drawing Sheet

(51) Int. Cl.

| | | |
|---|---|---|
| B32B 27/08 | (2006.01) | |
| B32B 27/20 | (2006.01) | |
| B32B 27/36 | (2006.01) | |
| C08L 67/02 | (2006.01) | |
| B32B 27/18 | (2006.01) | |
| C08K 3/013 | (2018.01) | |
| C08K 5/36 | (2006.01) | |
| C08L 67/03 | (2006.01) | |
| C08K 5/00 | (2006.01) | |
| C09J 167/02 | (2006.01) | |
| C09J 167/03 | (2006.01) | |
| B65B 5/02 | (2006.01) | |
| B65B 7/16 | (2006.01) | |
| B65D 1/12 | (2006.01) | |

(52) U.S. Cl.
CPC ..... *B32B 2250/02* (2013.01); *B32B 2250/244* (2013.01); *B32B 2307/40* (2013.01); *B32B 2307/4026* (2013.01); *B32B 2307/412* (2013.01); *B32B 2307/518* (2013.01); *B32B 2307/732* (2013.01); *B32B 2367/00* (2013.01); *B32B 2439/00* (2013.01); *B32B 2439/70* (2013.01); *C08J 2367/02* (2013.01); *C08J 2467/02* (2013.01); *C08K 3/013* (2018.01); *C08K 5/00* (2013.01); *C08K 5/36* (2013.01); *C08L 67/03* (2013.01); *C08L 2201/10* (2013.01); *C08L 2203/16* (2013.01); *C08L 2203/162* (2013.01); *C08L 2205/02* (2013.01); *C08L 2205/025* (2013.01); *C08L 2205/06* (2013.01); *C09J 167/02* (2013.01); *C09J 167/03* (2013.01); *Y10T 428/31681* (2015.04); *Y10T 428/31786* (2015.04)

(56) References Cited

U.S. PATENT DOCUMENTS

| | | | | |
|---|---|---|---|---|
| 4,898,897 | A * | 2/1990 | Kiyohara | C08G 63/88 523/343 |
| 4,921,670 | A * | 5/1990 | Dallmann | C08J 3/005 264/141 |
| 4,941,780 | A * | 7/1990 | Takahashi | B23B 27/143 407/114 |
| 5,288,559 | A * | 2/1994 | Oka | C09D 167/00 428/458 |
| 5,434,000 | A * | 7/1995 | Konagaya | C08J 5/18 428/329 |
| 5,447,561 | A * | 9/1995 | Chiba | C08K 9/04 524/121 |
| 5,541,244 | A * | 7/1996 | van der Meer | C08K 3/32 524/140 |
| 5,851,743 | A * | 12/1998 | Akao | G03C 3/00 430/501 |
| 6,017,599 | A * | 1/2000 | Sakamoto | B29C 71/0063 428/35.8 |
| 6,083,617 | A * | 7/2000 | Aoyama | C08J 5/18 423/700 |
| 6,451,941 | B1 * | 9/2002 | Urashima | C08K 3/36 526/212 |
| 6,780,482 | B2 | 8/2004 | Majima | |
| 2002/0102419 | A1 * | 8/2002 | Kawahara | B32B 27/36 428/458 |
| 2003/0069387 | A1 * | 4/2003 | Majima | B32B 15/08 528/271 |
| 2005/0053796 | A1 * | 3/2005 | Kawahara | B32B 27/36 428/480 |
| 2005/0118442 | A1 * | 6/2005 | Itoh | B32B 15/08 428/480 |
| 2005/0137313 | A1 * | 6/2005 | Wong | C08J 3/201 524/487 |
| 2005/0153157 | A1 * | 7/2005 | Matsubayashi | C22C 13/00 428/615 |
| 2005/0260417 | A1 * | 11/2005 | Yamanaka | B32B 15/08 428/425.8 |
| 2007/0071944 | A1 * | 3/2007 | Matsubara | B32B 15/08 428/141 |
| 2008/0108742 | A1 * | 5/2008 | Miyamoto | C08K 3/34 524/451 |
| 2009/0082529 | A1 * | 3/2009 | Kageyama | C08G 63/84 526/66 |
| 2010/0310824 | A1 * | 12/2010 | Oshima | B32B 27/36 428/141 |
| 2011/0226160 | A1 * | 9/2011 | Jesse | C09B 67/0002 106/412 |
| 2011/0233482 | A1 * | 9/2011 | Honjo | C09C 1/0021 252/515 |
| 2012/0329938 | A1 * | 12/2012 | Kim | C08K 7/02 524/494 |
| 2013/0045912 | A1 * | 2/2013 | Morschhaeuser | C08G 63/672 510/400 |
| 2014/0227529 | A1 * | 8/2014 | Yamanaka | B32B 15/09 428/416 |
| 2014/0339123 | A1 * | 11/2014 | Nakagawa | B32B 15/09 206/524.2 |
| 2014/0350163 | A1 * | 11/2014 | Kim | C08K 3/013 524/494 |
| 2015/0118494 | A1 * | 4/2015 | Vilner | C09C 1/3684 428/402 |
| 2015/0122812 | A1 * | 5/2015 | Nakagawa | B32B 15/09 220/62.13 |
| 2015/0280085 | A1 * | 10/2015 | Kang | H01L 33/60 362/341 |
| 2016/0009444 | A1 * | 1/2016 | Nakagawa | B32B 15/09 206/524.2 |
| 2016/0145462 | A1 * | 5/2016 | Kawamura | C08L 67/02 428/336 |
| 2016/0208093 | A1 * | 7/2016 | Kang | C08G 77/04 |
| 2016/0257099 | A1 * | 9/2016 | Yamanaka | B65D 25/14 |
| 2016/0355294 | A1 * | 12/2016 | Yamanaka | B05D 7/14 |
| 2017/0008256 | A1 * | 1/2017 | Yamanaka | B05D 7/14 |
| 2017/0266924 | A1 * | 9/2017 | Nakamura | B32B 15/09 |
| 2018/0029334 | A1 * | 2/2018 | Nakamura | B32B 27/36 |
| 2018/0044507 | A1 * | 2/2018 | Yoshida | B29B 13/065 |
| 2018/0065339 | A1 * | 3/2018 | Yamanaka | B32B 15/09 |
| 2018/0282538 | A1 * | 10/2018 | Shimoharai | C08K 5/098 |
| 2020/0009835 | A1 * | 1/2020 | Moritz | C08K 5/0041 |

FOREIGN PATENT DOCUMENTS

| | | | |
|---|---|---|---|
| JP | 05-287090 A | * | 11/1993 |
| JP | 10-044313 A | * | 2/1998 |
| JP | 2001-294769 A | * | 10/2001 |
| JP | 2004-268574 A | * | 9/2004 |
| JP | 2005-022236 A | * | 1/2005 |
| JP | 2005-022237 A | * | 1/2005 |
| JP | 2006-160981 A | | 6/2006 |
| JP | 2011-021169 A | * | 2/2011 |

OTHER PUBLICATIONS

JP 2011-021169 A (Kawarada) (published Feb. 3, 2011) full English translation (2011) (Year: 2011).*

JP 2001-294769 A (Otake et al) (published Oct. 23, 2001) partial English translation (2001) (Year: 2001).*

JP 59-049268 A (NODA) (published Mar. 21, 1984) full English translation (1984) (Year: 1984).*

International Search Report and Written Opinion, PCT/US2017/046284, dated Oct. 25, 2017 (10 pages).

Garche, "Encyclopedia of Electrochemical Power Sources", Elesevier 2009, Chapter titled "Fuel Cells—Proton—Exchange Membrane Fuel Cells", (p. 728).

* cited by examiner

BLUSH-RESISTANT FILM INCLUDING PIGMENTS

CROSS-REFERENCE TO RELATED APPLICATION(S)

This invention claims priority to U.S. Provisional Patent Application No. 62/373,566 filed Aug. 11, 2016, which is hereby incorporated by reference herein in its entirety.

FIELD OF INVENTION

This present invention generally relates to polyethylene terephthalate (PET) films for metal cans that resist discoloration resulting from exposure to steam during can sterilization. More specifically, the present invention relates to PET films for coating metal for food storage containers, aerosol product containers, and the like, that exhibit little or no blush discoloration.

BACKGROUND OF INVENTION

Metal containers are used for storage of many different materials in industrial and retail consumer product containment applications. Well-known examples of consumer metal storage container utilities include food cans, aerosol spray product cans and the like. Polyester films of various compositions are commonly laminated onto the can metal surface to provide a protective barrier against corrosive environmental conditions. These barrier films are typically laminated onto both sides of the metal so that the inner and outer side metal surfaces of the container are protected from degradation by the contained material and the external ambient environment, respectively. In the case of food containers, after containers are filled, they are exposed to a retort process that typically involves contacting a surface with live steam for a period of time to sterilize the can and pasteurize or partially cook the contents. Live steam means that steam directly contacts the surface of the container. The steam is usually superheated, i.e., above the boiling point of water. A nominal retort process calls for exposure to steam at a temperature of about 260° F. (127° C.) for 90 minutes. It is, thus, very desirable that the plastic and metal laminate structure of the container be able to withstand direct steam contact during such retort process conditions.

Retort processing of plastic laminated metal containers can adversely affect the quality of the container. An area of particular interest is a visually observable defect on the outer side of metal containers that manifests as discolored or cloudy spots or areas. In the canning industry, this defect is known as "blushing" or discoloration caused by the steam retort process. Exposure to steam can cause undesirable discoloration or "blushing" on the outer side surface of the can. In the case of plastic film laminated on metal for canned goods, blushing can be attributed to accelerated hydrolysis of the film surface on the outer side of the container promoted by exposure to condensing steam during the retort process.

Much attention has been devoted to the art of blush prevention of metal cans that use plastic film laminates on the outer side of the can. Blushing in polymer films can be caused by either surface erosion caused by accelerated hydrolysis, generally classified as severe blushing, or localized crystallinity changes within the film that appear as slightly hazy areas. A preferred polymer film composition is polyethylene terephthalate ("PET"). One of the most common methods cited to improve blush resistance uses polybutylene terephthalate ("PBT") blended with PET in at least the outermost surface of the film. In addition, it has been cited that the blend should be at least 30-60 wt. % PBT for effective blushing prevention. There is no clear consensus on the reason for PBT's role in suppressing blushing. One theory is based on PBT's enhanced hydrolytic stability; another theory is based on PBT's faster crystallization rate, which allows the polymer/metal interface to recrystallize (and, thus, be less susceptible to hydrolysis) after lamination and heat treatment at elevated temperature.

However, it has been discovered that films' mere incorporation of PBT at high levels does not always completely eliminate the blush formation problem in all cases and under all possible film extrusion, lamination conditions, and retort processes. Without being bound by any theory, one factor that significantly affects the effectiveness of PBT to suppress blushing when blended with PET is the phenomenon called trans-esterification or ester interchange. At longer melt residence times or higher extrusion temperatures, PBT is known to react with PET and form ester interchange products (copolymers) with varying degrees of randomness (with regard to the positioning of PET and PBT repeat units) and PET/PBT ratio. This effect tends to lower the crystallinity, crystallization rate, and melting point of each one of the starting blend ingredients and result in a PBT copolymerized with PET that is less effective in controlling blushing.

Methods to suppress this phenomenon have been proposed. Representative methods involve minimizing residence time in the melt during which the two polymers are in contact or using polymerization catalysts, which are also known to promote trans-esterification, of types and levels that do not cause significant ester interchange; or minimizing hydroxyl end-groups. Another method involves the use of trans-esterification inhibitors such as phosphorous compounds. However, those methods are not always readily accessible by film producers. For example, resins with low acid end-groups or optimized catalyst packages may not be broadly available, especially if the producer has no PET polymerization capability in house. Trans-esterification inhibitors are not always effective. Extrusion systems minimizing melt contact of the blend ingredients may require capital modifications that may be prohibitively expensive or may not be readily adaptable to large-scale film production lines.

A key aspect that compromises consistency of applying PBT blending against blushing is that for the same film structure (PBT content, processing conditions), results vary depending on whether the steam sterilization test is conducted using a lab apparatus (e.g., pressure cooker) vs. an industrial autoclave. In general, it has been found that autoclave sterilization is more likely to induce blushing, perhaps related to the higher level of enthalpic steam energy involved. Adding higher levels of PBT (i.e., 65 wt. % or higher) may be effective; however, at that level, the film can be difficult to process at economic speeds on industrial-scale biaxial orientation equipment.

Thus, there is still a need in the canning industry for a polymeric lamination film that exhibits improved blushing resistance in a robust manner under a wide range of conditions and sterilization equipment, and excellent resistance to harsh chemicals and aggressive foods being stored in these containers. A need exists for polyester films for a protective barrier on the outer side of a metal can that will withstand the rigorous conditions of retort processing without blushing.

SUMMARY OF THE INVENTION

According to one embodiment, a biaxially oriented polymeric film comprising a base layer which comprises from about 35 wt. % to about 80 wt. % of polyester (A), from about 20 wt. % to about 65 wt. % of polyester (B), and from about 0.01 wt. % to about 1 wt. % of a pigment compound. Polyester (A) comprises polybutylene terephthalate. Polyester (B) comprises polyethylene terephthalate. The pigment compound contains polar functional groups to assist in minimizing trans-esterification between polyester (A) and polyester (B). The polymeric film has a haze value of less than about 90% and a thickness of from about 5 µm to about 75 µm.

According to another embodiment, a biaxially oriented polymeric film comprising a base layer which comprises from about 35 wt. % to about 80 wt. % of polyester (A), from about 20 wt. % to about 65 wt. % of polyester (B), and from about 0.01 wt. % to about 1 wt. % of a pigment compound and at least one skin layer adjacent and directly in contact with the base layer. Polyester (A) comprises polybutylene terephthalate. Polyester (B) comprises polyethylene terephthalate. The pigment compound contains polar functional groups to assist in minimizing trans-esterification between polyester (A) and polyester (B). The at least one skin layer comprises from about 35 wt. % to about 80 wt. % of polyester (C) and from about 20 wt. % to about 65 wt. % of polyester (D). Polyester (C) comprises polybutylene terephthalate. Polyester (D) comprises polyethylene terephthalate. The polymeric film has a haze value of less than about 90% and a thickness of from about 5 µm to about 75 µm.

According to a further embodiment, a multilayered structure comprising a biaxially oriented polymeric film which includes a base layer and a metal sheet adjacent to the polymeric film. The base layer comprises from about 35 wt. % to about 80 wt. % of polyester (A), from about 20 wt. % to about 65 wt. % of polyester (B), and from about 0.01 wt. % to about 1 wt. % of a pigment compound. Polyester (A) comprises polybutylene terephthalate. Polyester (B) comprises polyethylene terephthalate. The pigment compound contains polar functional groups to assist in minimizing trans-esterification between polyester (A) and polyester (B). The metal sheet has a thickness of from about 25 µm to about 1,300 µm. The polymeric film has a haze value of less than about 90% and a thickness of from about 5 µm to about 75 µm.

According to a further embodiment, a method for packaging a product in a container, the method comprising providing a multilayered structure which comprises a first biaxially oriented polymeric film and a metal sheet adjacent to the first polymeric film, fabricating a container comprising the multilayered structure such that the first polymeric film is positioned on an outer wall of the container, placing product in the container, and sealing the container. The first biaxially oriented polymeric film includes a base layer. The base layer comprises from about 35 wt. % to about 80 wt. % of polyester (A), from about 20 wt. % to about 65 wt. % of polyester (B), and from about 0.01 wt. % to about 1 wt. % of a pigment compound. Polyester (A) comprises polybutylene terephthalate. Polyester (B) comprises polyethylene terephthalate. The pigment compound contains polar functional groups to assist in minimizing trans-esterification between polyester (A) and polyester (B). The first polymeric film has a haze value of less than about 90% and a thickness of from about 5 µm to about 75 µm. The metal sheet has a thickness of from about 25 µm to about 1,300 µm.

The above summary is not intended to represent each embodiment or every aspect of the present invention. Additional features and benefits of the present invention are apparent from the detailed description and figures set forth below.

BRIEF DESCRIPTION OF THE DRAWINGS

Other advantages of the invention will become apparent upon reading the following detailed description and upon reference to the drawings in which.

Figure 1:
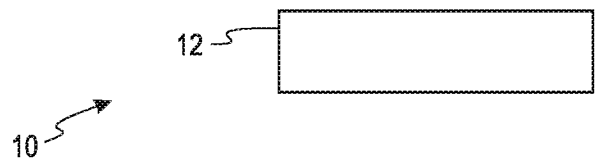
FIG. 1 is a generally cross-sectional view of a film according to one embodiment of the present invention.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Referring to FIG. 1, a polymeric film 10 of the present invention includes a first or base layer 12. The base layer 12 includes from about 35 to about 80 wt. % of polyester (A), from about 20 to about 65 wt. % of polyester (B), and from about 0.01 to about 1 wt. % of a pigment compound. Polyester (A) comprises polybutylene terephthalate (PBT). Polyester (B) comprises polyethylene terephthalate (PET). The pigment compound contains polar functional groups to assist in minimizing trans-esterification between polyester (A) and polyester (B). The polymeric film 10 is typically biaxially oriented as further detailed below.

Polymeric film 10 generally has a haze value of less than about 90%. More specifically, polymeric film 10 has a haze value of less than about 70% in some embodiments, less than about 50% in other embodiments, less than about 30% in further embodiments, and less than about 10% in still further embodiments.

Polymeric film 10 generally has a thickness of from about 5 to about 75 µm. More specifically, polymeric film 10 has a thickness of from about 8 to about 50 µm in some embodiments, and from about 10 to about 25 µm in still further embodiments.

As detailed above, the base layer 12 includes from about 35 to about 80 wt. % of polyester (A). The base layer 12 includes from about 40 to about 75 wt. % of polyester (A) in some embodiments, from about 45 to about 60 wt. % of polyester (A) in other embodiments, from about 50 to about 60 wt. % of polyester (A) in further embodiments, and from about 50 to about 55 wt. % of polyester (A) in still further embodiments. In addition to improving crystallization rate, polybutylene terephthalate has the additional function of lowering the temperature necessary for proper adhesion to the metal substrate due to its lower melting point as compared to a film comprising polyethylene terephthalate only.

As detailed above, the base layer 12 includes from about 20 to about 65 wt. % of polyester (B). The base layer 12 includes from about 40 to about 60 wt. % of polyester (B) in some embodiments.

The base layer 12 includes from about 0.01 to about 1 wt. % of the pigment compound. The base layer 12 includes from about 0.02 to about 0.7 wt. % of the pigment compound in some embodiments and from 0.04 to about 0.2 wt. % of the pigment compound in other embodiments. It has surprisingly been found that adding the pigment compounds described herein and at the levels described herein is effective in suppressing blushing at PBT levels as low as 50 wt. % under a wide range of sterilization conditions and sterilization equipment.

The inventors have surprisingly discovered that certain colorant compositions typically used in combination to achieve a golden hue, such as yellow and red pigments, when incorporated in the inventive films comprising blends of PET and PBT result in reduced levels of trans-esterification. The reduced levels of trans-esterification are manifested by more closely preserving the original melting points of the PET and PBT ingredients and displaying excellent resistance to blushing during retort sterilization at PBT levels as low as 50 wt. %.

The pigment compounds used in the present invention may be used individually or as different combinations of pigment compounds such as a color concentrate. Non-limiting examples of pigment compounds that may be used in the base layer 12 include primary yellow (PY-191), primary red (PR 122), carbon black, and combinations thereof. One example of a color concentrate comprises primary yellow PY 191, primary red PR 122, and carbon black. The pigment compound includes at least one sulfonate functional group. The yellow pigment compounds may contain functional groups added via masterbatch. Concentrates of additives dispersed in a polymer are referred to as masterbatches, specifically referring to a concentrated mixture of pigments and/or additives encapsulated during a heat process into a carrier resin, which is then cooled and cut into granular shapes. As used in the present invention, pigments are admixed with PET, extruded, and pelletized as is known in the art.

The pigment compounds used in the films described herein can be used in can liner films to provide a golden appearance. Specifically, when films produced with the pigment compounds described herein are subsequently laminated to a metal substrate of electro-tin plated steel, tin-free steel or aluminum, the result is a golden appearance. Historically, the purpose of the golden appearance is meeting desired aesthetics for marketing purposes. To achieve a desired "golden" film color, the total pigment mixture in one embodiment may comprise approximately 94%-99% PY-191, 1%-5% PR-122, and 1% or less carbon black in one embodiment and 93%-100% PY-191, 6% or less PR-122, and 1.2% or less carbon black in another embodiment.

It is noted that other polar dye compositions may be used in the films of the present invention. A more comprehensive list of polar dye compositions for use in the films of the present invention can be found online in the "Color of Art Pigment Database" at http://www.artiscreation.com/Colorindexnames.html#.V37Hv9IrLcs.

Without being bound by any specific theory, the inventors believe that one possible reason for the improved antiblush performance provided by the pigments is tied to the existence of functional polar groups, including the sulfonic acid group —$SO_3H$, the secondary amine group —NH— and the carbonyl group =O, present in their molecular backbones. One possible theory is that these functional groups create hydrogen bonding with the ester carbonyl present in PET and PBT and, thus, protect the ester group against trans-esterification reaction. Another theory is that the molecular interaction between the sulfonate groups and the titanium butoxide (aka tetrabuyltitanate) present in PBT effectively reactivates the catalyst and reduces the tendency for trans-esterification since the polymerization catalyst also catalyzes PBT:PET trans-esterification. Another possible reason for improved antiblush properties may be that introducing nanoparticles increases the rate of crystallization through nucleation.

The extent of trans-esterification can be accurately quantified by NMR but, for practical purposes, it can also be approximately mapped by differential scanning calorimetry (DSC). In the absence of trans-esterification, a DSC heating thermogram would shows two distinct melting endotherm peaks—one for PET and one for PBT at their original values of around 255° C. and 223° C., respectively. Depending on the amount of trans-esterification, a PET/PBT melt compounded blend shows a decrease in the melting point of the PET portion of the polymer blend film due to the formation of a spectrum of various PET-PBT co-polyester species simplistically represented by a "PET-rich" copolyester and a "PBT-rich" copolyester. Both of those copolymers can exhibit lower melting points relative to the virgin PET and PBT because the insertion of copolymer groups disrupts the crystal formation, but the PET portion is typically more adversely affected. It has been surprisingly discovered that films comprising both PBT and PET had greater resistance to trans-esterification as measured by the PET melting peak by DSC, when as little as 0.01 wt. % of the pigment compounds described herein were incorporated into the polymer blend used in manufacturing the film. As a result, when these films were ultimately laminated to a metal substrate and subsequently tested for blushing during sterilization, the inventive films containing the pigment compounds described herein were found to have improved blush resistance over films with similar PBT content lacking such pigment compounds.

The films of the present invention can be a monolayer film such as that shown in FIG. 1. The films of the present invention can also be multilayer film(s). FIGS. 2-5 show examples of multilayer films according to other embodiments of the present invention.

Figure 2:
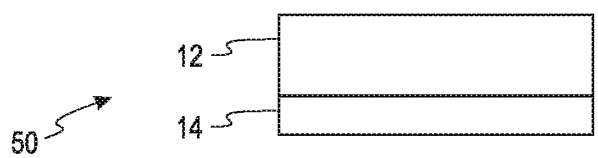
FIG. 2 is a generally cross-sectional view of a film according to another embodiment of the present invention.

Referring to FIG. 2, a polymeric film 50 includes the first or base layer 12 and a skin layer 14. The base layer 12 of the polymeric film 50 has the features of the base layer 12 of polymeric film 10 of FIG. 1. That is, the base layer 12 includes from about 35 to about 80 wt. % of polyester (A), from about 20 to about 65 wt. % of polyester (B), and from about 0.01 to about 1 wt. % of a pigment compound where polyester (A) comprises polybutylene terephthalate and polyester (B) comprises polyethylene terephthalate. The pigment compound of polymeric film 50 contains polar functional groups to assist in minimizing trans-esterification between polyester (A) and polyester (B). For the polymeric film 50, it is contemplated that polyester (A) of the base layer 12 and polyester (C) of the skin layer 14 may be identical and polyester (B) of the base layer 12 and polyester (D) of the skin layer 14 are identical. The polymeric film 50 is typically biaxially oriented as further detailed below.

Similar with the base layer 12 of polymeric film 10, the base layer 12 of polymeric film 50 includes from about 35 to about 80 wt. % of polyester (A), from about 40 to about 75 wt. % of polyester (A) in some embodiments and from about 50 to about 65 wt. % of polyester (A) in other embodiments.

Similar to the base layer 12 of polymeric film 10, the base layer 12 of polymeric film 50 includes from about 20 to about 65 wt. % of polyester (B) and from about 40 to about 60 wt. % of polyester (B) in some embodiments.

The pigment compound(s) of the base layer 12 of polymeric film 50 has the features of the pigment compound(s) of polymeric film 10 of FIG. 1 described herein. Similar with the base layer 12 of polymeric film 10, the base layer 12 of polymeric film 50 includes from about 0.01 to about 1 wt. % of the pigment compound, from about 0.02 to about 0.7 wt. % in some embodiments and from 0.04 to about 0.2 wt. % in other embodiments. As in the base layer 12 of polymeric film 10, the pigment compound of polymeric film 50 includes at least one sulfonate functional group. Non-limiting examples and further details about the pigment compound(s) for use in the films, such as polymeric film 50, of the present invention are detailed above.

The skin layer 14 of polymeric film 50 is adjacent and directly in contact with a side of the base layer 12. The skin layer 14 comprises from about 35 to about 80 wt. % of polyester (C) and from about 20 to about 65 wt. % of polyester (D). Polyester (C) comprises polybutylene terephthalate. Polyester (D) comprises polyethylene terephthalate. The skin layer 14 includes at least 40 wt. % of polyester (C), at least 50 wt. % in other embodiments, and at least 60 wt. % in further embodiments. The skin layer 14 of polymeric film 50 optionally includes from about 0.01 to about 1 wt. % of the pigment compound(s) described herein, from about 0.02 to about 0.7 wt. % of the pigment compound(s) in some embodiments and from 0.04 to about 0.2 wt. % of the pigment compound(s) in other embodiments. The pigment compound(s) in the skin layer 14 contain polar functional groups to assist in minimizing trans-esterification between polyester (C) and polyester (D). As detailed above, the pigment compound(s) used in the skin layer 14 may be used individually or as different combinations of pigment compounds such as a color concentrate. Non-limiting examples of pigment compounds that may be used in the skin layer 14 include primary yellow (PY-191), primary red (PR 122), carbon black, and combinations thereof.

Polymeric film 50 generally has a haze value of less than about 90%. Similar with the haze value of polymeric film 10, polymeric film 50 has a haze value of less than about 70% in some embodiments, less than about 50% in other embodiments, less than about 30% in further embodiments, and less than about 10% in still further embodiments.

Polymeric film 50 generally has a thickness of from about 5 to about 75 μm. Similar to the thickness of polymeric film 10, polymeric film 50 has a thickness of from about 8 to about 50 μm in some embodiments, and from about 10 to about 25 μm in still further embodiments.

Figure 3:
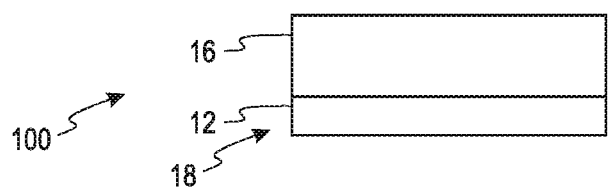
FIG. 3 is a generally cross-sectional view of a film according to a further embodiment of the present invention.
Figure 4:
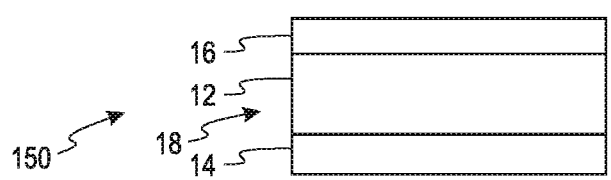
FIG. 4 is a generally cross-sectional view of a film according to yet another embodiment of the present invention.
Figure 5:
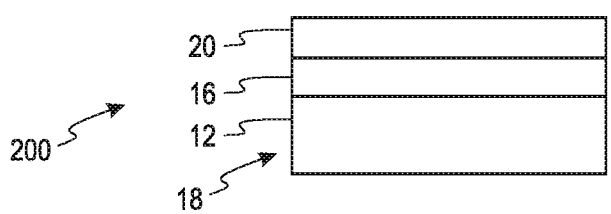
FIG. 5 is a generally cross-sectional view of a film according to a further embodiment of the present invention.

The present invention also provides multilayered films that are multilayered composite structures containing a metal substrate such as a metal sheet. FIGS. 3-5 show examples of multilayered structures that include a metal substrate and more specifically, a metal sheet.

Referring to FIG. 3, a multilayered structure 100 comprising a polymeric film 18 that includes the first or base layer 12 and a metal sheet or substrate 16 located adjacent to the base layer 12. The base layer 12 of the multilayered structure 100 has the features of the base layer 12 of FIG. 1. That is, the base layer 12 of the multilayered structure 100 includes from about 35 to about 80 wt. % of polyester (A), from about 20 to about 65 wt. % of polyester (B), and from about 0.01 to about 1 wt. % of a pigment compound where polyester (A) comprises polybutylene terephthalate and polyester (B) comprises polyethylene terephthalate. The pigment compound of the base layer 12 of the multilayered structure 100 contains polar functional groups to assist in minimizing trans-esterification between polyester (A) and polyester (B). The polymeric film 18 of the multilayered structure 100 generally has a haze value of less than about 90% and a thickness of from about 5 to about 75 μm. The polymeric film 18 of the multilayered structure 100 is typically biaxially oriented as further detailed below. The polymeric film 18 of the multilayered structure 100 can be positioned on an outer side of a can or container.

The metal sheet 16 of the multilayered structure 100 generally has a thickness of from about 25 to about 1,300 μm. More specifically, the metal sheet 16 has a thickness of from about 25 to about 300 μm in some embodiments, from about 50 to about 500 μm in other embodiments, from about 150 to about 300 μm in other embodiments, from about 25 to about 150 μm in further embodiments, and from about 25 to about 50 μm in still further embodiments.

The metal substrates or metal sheets for use in this invention include electrolytic chrome-coated steel (occasionally referred to as "tin free steel" or "TFS"), electro-tin plated steel, aluminum, aluminum alloys, and combinations thereof.

Typically, the polymeric film 18 is affixed by lamination including thermal lamination to a metal substrate suitable for use as a can or a metal container in the canning industry. The laminated metal is intended as a raw material in the fabrication of containers for the storage of diverse goods such as canned food items. Using the inventive films, food and chemical containers such as food storage cans and containers resist blush discoloration from steam contact during container sterilization.

Referring to FIG. 4, a multilayered structure 150 is shown, which further includes a skin layer. In the multilayered structure 150 of FIG. 4, the base layer 12 is located between the skin layer 14 and the metal sheet 16. The base layer 12 of the multilayered structure 150 has the features of the base layer 12 of FIG. 2. That is, the base layer 12 of the multilayered structure 150 includes from about 35 to about 80 wt. % of polyester (A), from about 20 to about 65 wt. % of polyester (B), and from about 0.01 to about 1 wt. % of a pigment compound. Polyester (A) comprises polybutylene terephthalate. Polyester (B) comprises polyethylene terephthalate. The pigment compound contains polar functional groups to assist in minimizing trans-esterification between polyester (A) and polyester (B). The skin layer 14 of the multilayered structure 150 has the features of the skin layer 14 of FIG. 2. That is, the skin layer 14 includes from about 35 to about 80 wt. % of polyester (C) and from about 20 to about 65 wt. % of polyester (D). Polyester (C) comprises polybutylene terephthalate. Polyester (D) comprises polyethylene terephthalate. For the multilayered structure 150, it is contemplated that polyester (A) of the base layer 12 and polyester (C) of the skin layer 14 may be identical and polyester (B) of the base layer 12 and polyester (D) of the skin layer 14 are identical. It is also contemplated that the multilayered structure 150 described herein may be formulated where the skin layer 14 is located between the base layer 12 and the metal sheet 16 (not shown).

The skin layer 14 of the multilayered structure 150 optionally includes from about 0.01 to about 1 wt. % of the pigment compound(s) described herein, from about 0.02 to about 0.7 wt. % of the pigment compound(s) in some embodiments and from 0.04 to about 0.2 wt. % of the pigment compound(s) in other embodiments. These pigment compound(s) contain polar functional groups to assist in minimizing trans-esterification between polyester (C) and polyester (D). As detailed above, the pigment compound(s) used in the skin layer 14 may be used individually or as different combinations of pigment compounds such as a color concentrate. Non-limiting examples of pigment compounds that may be used in the skin layer 14 include primary yellow (PY-191), primary red (PR 122), carbon black, and combinations thereof. The metal sheet 16 of the multilayered structure 150 has the features of the metal sheet 16 of FIG. 3. That is, the metal sheet 16 of the multilayered structure 150 generally has a thickness of from about 25 to about 1,300 µm. The polymeric film 18 of FIG. 4 generally has a haze value of less than about 90% and a thickness of from about 5 to about 75 µm. The polymeric film 18 of FIG. 4 is typically biaxially oriented as further detailed below. The polymeric film 18 of the multilayered structure 150 can be positioned on an outer side of a can or container.

The protective barrier system of this invention employs a polymeric film which can be affixed to the surface of a metal substrate to coat and thereby protect the metal surface from adverse effects of exposure to contact with steam. The invention includes a method for packaging a product in a container which (using reference to FIG. 3) comprises (i) providing the multilayered structure 100 comprising the polymeric film 18 that includes the base layer 12 and the metal sheet 16 located adjacent to the base layer 12, (ii) fabricating a container (not shown) comprising the multilayered structure such that the polymeric film 18 is positioned on an outer wall of the container; (iii) placing the product in the container; and (iv) sealing the container. The base layer 12 has the features of the base layer 12 of FIG. 1. That is, the base layer 12 includes from about 35 to about 80 wt. % of polyester (A), from about 20 to about 65 wt. % of polyester (B), and from about 0.01 to about 1 wt. % of a pigment compound where polyester (A) comprises polybutylene terephthalate and polyester (B) comprises polyethylene terephthalate and the pigment compound contains polar functional groups to assist in minimizing trans-esterification between polyester (A) and polyester (B). The polymeric film 18 of the multilayered structure 100 generally has a haze value of less than about 90% and a thickness of from about 5 to about 75 µm. The metal sheet 16 generally has a thickness of from about 25 to about 1,300 µm.

In an alternative embodiment, the invention includes a method for packaging a product in a container where the method described above in reference to the multilayered structure 100 of FIG. 3 further comprises a second polymeric film. Referring to FIG. 5, a multilayered structure 200 is shown which comprises the polymeric film 18 that includes the base layer 12 and the metal sheet 16 and a second polymeric film 20. The polymeric film 18, base layer 12 and metal sheet 16 of the multilayered structure 100 have the features described above in reference to FIG. 3. The metal sheet 16 is located between the base layer 12 of the polymeric film 18 and the second polymeric film 20. The second polymeric film 20 has a general thickness of from about 5 µm to about 75 µm.

In a further alternative embodiment, the invention includes a method for packaging a product in a container where the multilayered structure includes a skin layer. Using reference to FIG. 4, a method for packaging a product in a container which comprises (i) providing the multilayered structure 150 comprising the polymeric film 18 that includes the base layer 12, the metal sheet 16 and the skin layer 14, (ii) fabricating a container (not shown) comprising the multilayered structure such that the polymeric film is positioned on an outer wall of the container; (iii) placing the product in the container; and (iv) sealing the container. The base layer 12 is located between the skin layer 14 and the metal sheet 16. The base layer 12 of the multilayered structure 150 has the features of the base layer 12 of FIG. 1, and the skin layer has the features of the skin layer 14 of FIG. 2. The base layer 12 comprises from about 35 to about 80 wt. % of polyester (A), from about 20 to about 65 wt. % of polyester (B), and from about 0.01 to about 1 wt. % of a pigment compound. Polyester (A) comprises polybutylene terephthalate and polyester (B) comprises polyethylene terephthalate. The skin layer 14 comprises from about 35 to about 80 wt. % of polyester (C) and from about 20 to about 65 wt. % of polyester (D). Polyester (C) comprises polybutylene terephthalate and polyester (D) comprises polyethylene terephthalate.

It is noted that the base layer(s) described herein are thicker than the skin layer(s) described herein and provide barrier properties for traditional protection of the metal substrate and container contents. In some embodiments, the skin layer(s) described herein may also be used and/or formulated as a bonding layer to the metal sheet(s) or metal substrate(s) described herein. The skin layer(s) described herein generally have a thickness of from about 0.1 to about 25 µm in some embodiments, from about 0.2 to about 12 µm in other embodiments, and from about 0.3 to about 3 µm in further embodiments. The total thickness of the multilayered structure(s) described herein is from about 5 to about 75 µm in some embodiments, from about 8 to about 50 µm in other embodiments, and from about 10 to about 25 µm in further embodiments.

The multilayered structures described herein (i.e., the multilayered structure 100 and 150) may be fabricated in the form of a can such as a food storage can or a chemical storage can or a container such as a food storage container or an aerosol container. The polymeric films described herein can be laminated on either side or both sides of the metal substrate of the can or container. In context of laminated metal substrate for containers, the side of the substrate or laminated composite structure facing the contents interior to the container is referred to as the inner side of the laminated composite structure. Similarly, the side of the laminated composite structure on the exterior of the container is identified as the outer side.

It is noted that the polyethylene terephthalate (PET) films suitable for use in this invention are typically biaxially oriented prior to laminating the film to the metal substrate. The films are biaxially oriented by conventional methods known in the art. Typically, a raw material PET resin or a blend of PET with other polyester resins is supplied in solid form to a melt processing device, preferably a continuous screw extruder. The heating of the melt processor is controlled to maintain the polyester resin above its melting point but below polymer degradation temperature. Polyester molten resin is extruded from an appropriately shaped die to form a thin, flat ribbon of polymer melt. The polymer ribbon is quenched in air and/or on a chilled roll to form a solid, self-supporting film. The film is taken up by sets of rollers turning at different rotation speeds that stretch the film in the direction of continuous forward motion, referred to as the machine direction ("MD"). The stretching can be accompanied by heating of the film to establish crystal orientation in the MD. The mono-directionally oriented film is clamped at its opposite edges and stretched in the transverse machine direction ("TD") laterally perpendicular to the MD in a tenter oven. The tenter oven is heated to temperatures operative to establish crystal orientation in the TD thus forming a biaxially oriented polyester film. Preferably, biaxially oriented polyester film for use with this invention is stretched about 100%-600% in the MD and 100%-600% in the TD. The biaxially oriented film can be heat set at temperatures preferably between about 300° F. (149° C.) and about 490° F. (254° C.), more preferably about 350° F. (177° C.) to about 460° F. (238° C.) to minimize thermal shrinkage and maximize thermal dimensional stability.

It is also noted that recycled PET and PBT can be used in the films of the present invention. Recycled PET means PET that has been through a post-polymerization, thermal process such as film forming, yarn spinning, compression molding, thermoforming, and the like. Such processes tend to slightly degrade PET relative to virgin polymer.

Both the base layers and the skin layers described herein can also include antiblock and slip additives for controlling COF (coefficient of friction) and web handling. These are typically solid particles dispersed within the outer layer to produce a low coefficient of friction on the exposed surface of the outer layer(s). This low coefficient of friction helps the film to move smoothly through the film formation, stretching and wind-up operations. Without such antiblocking and slip additives, the outer surfaces would be more tacky and would more likely cause the film being fabricated to stick to itself and to processing equipment causing excessive production waste and low productivity.

Examples of antiblock and slip additives that may be used herein include, but are not limited to, amorphous silica particles with mean particle size diameters in the range of about 0.05 to about 5 μm at concentrations of about 0.1 to about 0.4 mass percent, calcium carbonate particles with a medium particle size of about 0.3 to about 2 μm at concentrations of about 0.03 to about 0.2 mass percent. Precipitated alumina particles of sub-micron sizes may be used with an average particle size, for example, of about 0.1 μm and a mass percent of about 0.1 to about 0.4. Additional examples include inorganic particles, aluminum oxide, magnesium oxide, and titanium oxide, such complex oxides as kaolin, talc, and montmorillonite, such carbonates as calcium carbonate, and barium carbonate, such sulfates as calcium sulfate, and barium sulfate, such titanates as barium titanate, and potassium titanate, and such phosphates as tribasic calcium phosphate, dibasic calcium phosphate, and monobasic calcium phosphate. Two or more of these may be used together to achieve a specific objective. As examples of organic particles, vinyl materials as polystyrene, crosslinked polystyrene, crosslinked styrene-acrylic polymers, crosslinked acrylic polymers, crosslinked styrene-methacrylic polymers, and crosslinked methacrylic polymers, as well as such other materials as benzoguanamine formaldehyde, silicone, and polytetrafluoroethylene may be used or contemplated.

One way to incorporate the aforementioned antiblock particles is via masterbatch addition. In that embodiment, each polyester film layers is produced by extruding a pellet-to-pellet mix (i.e., dry blend) of standard crystalline polyester, color concentrate for enhancing blush resistance, and the polyester masterbatch, which is loaded with the antiblock and/or slip additives.

Proper antiblock incorporation is confirmed by measuring surface roughness. The surface roughness, Ra, of the exposed outer surfaces skin layers is each independently from about 5 to about 350 nm in some embodiments, from about 10 to about 250 nm in other embodiments, and from about 15 to about 150 nm in further embodiments.

Other important aspects of films designed to have antiblush properties are the crystallization temperature and the crystallization peak aspect ratio. The crystallization peak aspect ratio is defined as the width of the crystallization peak at half height divided by the full peak height. The addition of PBT decreases the peak crystallization temperature; however, some level of PBT is required to achieve robust antiblush properties. At higher levels of PBT, the addition of pigments has a strong impact on mitigating the reduction of the crystallization temperature. Thus, the preferred peak crystallization temperature of a film is dependent of the level of PBT incorporated into the film design. Conversely, the crystallization peak aspect ratio increases as the percentage of PBT increases. It is known in the art that a lower peak aspect ratio equates to more rapid crystallization and improved antiblush performance. Surprisingly, the addition of pigment reduces the crystallization peak aspect ratio at PBT loadings above 50%. Preferred crystallization peak aspect ratios as defined above are less than 100° C. W/g in some embodiments, less than 50° C. W/g in other embodiments, and less than 20° C. W/g in further embodiments.

As previously discussed, during the process of film making when the PET and PBT polymer blend is in the melt phase, the residual catalysts from each polymer can become active and with sufficient temperature, time, and mixing the PET and PBT can undergo ester exchanges also known as trans-esterification that in turn create random PET/PBT co-polymers. It can be demonstrated that the addition of pigments change both the melt and crystallization behavior of the blended PET and PBT polymers. More specifically, the addition of pigments can help to maintain a melting point of the PET component of the polymer blend in the film closer to that of plain PET film, which is an indication of hindered trans-esterification.

It should be stressed that the PET melt peak is greatly affected by both extrusion residence time and melt temperature. The effectiveness of the pigment to supress trans-esterification becomes more critical as the extrusion residence time and melt temperature increase. The melting point of first heat for the PET-rich phase is at least 240° C. in some embodiments, at least 245° C. in other embodiments, and more than 250° C. in further embodiments. The melting point of first heat for the PBT-rich phase is at least 210° C. in some embodiments, at least 215° C. in other embodiments, and at least 220° C. in other embodiments.

The PET film of the inner and outer side of the container has the same or different physical properties depending on the end use application for the composite structures described herein. For example, in a canned food utility after packing with food, the container is subjected to a retort process for sterilizing the food contents. Later, during service life, the outer side laminated film will be exposed to ambient atmospheric environmental conditions. In contrast, the inner laminated film in addition to the retort process will be subjected to extended time contact with contents that may exhibit potentially adverse interaction with the composite. Thus, different inner and outer side polymer films may be used where the conditions of exposure are different.

EXAMPLES

The below examples further define various aspects of the present disclosure. These examples are intended to be illustrative only and are not intended to limit the scope of the present disclosure. The present invention is illustrated by examples of certain representative embodiments thereof, wherein all parts, proportions and percentages are by weight unless otherwise indicated.

Testing Methods

The various properties in the below examples were measured by the following methods:

Thickness: Overall film thickness of a monolithic film was determined by measuring the thickness of a stack of 10 sheets of the film by micrometer and dividing the measurement by 10. Measurements were repeated every 9 inches (22.9 cm) in the transverse direction of the film. Thickness of each coextruded layer of the multilayer film and total thickness were measured by adding alumina particles to alternating film layers to differentiate adjacent layers of small cross-sectioned pieces of film cut perpendicular to the plane of the film and examined by scanning electron microscope (SEM).

Surface Roughness: Average surface roughness (Ra) was measured with a Surfcorder SE-500 surface roughness measurement instrument (Kosaka Laboratory, Ltd., Japan). The measurements were repeated 3 times and the average value of Ra was recorded.

Intrinsic viscosity (IV): IV was measured using a solution viscometer at 25° C. A sample solution was prepared by dissolving at 103° C. 100±1 mg polymer in 30 mL solution of a mixture of 40% 1,1,2,2-tetrachloroethane and 60% phenol. IV was calculated by the formula, $IV=[(t_{avg}/t_0-1)-2 \ln (t_{avg}t_0)]0.5/[(sample/20)*(100\%)]$, where $t_{avg}$ and $t_0$ are the average of four trial times in seconds to run dissolved polymer solution and solvent solution only through the viscometer, respectively. IV values for PET resins used in Examples 1-9 and Comparative Examples 1-3 were 0.6-0.8 dl/g. IV values for PBT resins used in Examples 1-9 and Comparative Examples 1-3 were 0.9-1.3 dl/g.

Blush resistance: Laminated film-on-metal samples were cut or stamped to circular shape of metal container lids. Tap water at 25° C. was placed into 8 oz. metal containers. The sample container lids were attached to the container and placed into a pressure cooker lid-side-down so that the water inside the container was in contact with the lid. A small amount of water was placed in the pressure cooker around the container to generate steam inside the covered pressure cooker when heated to raise temperature of the samples for 90 minutes to 250° F. (121° C.). The samples were allowed to cool and evaluated visually for blushing.

Blushing testing in commercial sterilization equipment (Allpax 2402 Stretch R&D Unit Retort, Covington, La.) utilized the same duration (90 min.) for the main phase of the retort cycle at 251° C. and 15.3 psig internal chamber pressure (using steam), with the difference being that the heat-up time (utilizing steam) was much faster (4 min. to come up to 251° C.) and the cooling time (cooling conducted by spraying with city water) was also very short (9 min.). Also in that case, the laminated sheets were exposed by placing on the equipment rack, i.e., not attached to glass jars ("flat panel test"). The samples were allowed to cool and evaluated visually for blushing.

Film Melting Points, Peak Crystallinity Temperatures, and Crystallinity Aspect Ratio were measured using a TA Instruments Differential Scanning calorimeter Model 2920 (TA Instruments, Del.). The samples were tested in accordance with test procedure ASTM D3418-03 (2003). The sample size was 0.007 g. A first heating was applied at a heating rate of 10° C./min from 40° C. to 280° C. and the resulting melting points of the PBT-rich phase and the PET-rich phase were recorded as the peaks of the corresponding melting endotherms. Subsequently, the molten sample was cooled back to 40° C. at a rate of 10° C./min and the crystallization temperature on cooling was recorded as the peak of the crystallization exotherm. The Crystallinity Aspect Ratio is defined herein as the width of the crystallization peak at half height, divided by the full peak height. In some cases, the crystallization curve creates a twin peak, in which case the most prominent one being the value reported.

Raw Materials

The following materials were used in Examples 1-9 and Comparative Examples 1-3:

PET: Intrinsic viscosity (IV) of 0.5-0.80 and a melting point of approximately 255° C.

PBT: Intrinsic viscosity (IV) of 0.9-1.1 and a melting point of approximately 223° C.

Silica: Average size of 2.5 micron incorporated into PET during polymerization (dispersed in ethylene glycol and added to PET during polymerization).

Color concentrate produced by compounding pigment with PET carrier resin. The pigments used in the following examples comprised a blend of primary pigments, more specifically, 94%-99% PY-191, 1%-5% PR-122, and less than 1% carbon black.

The film preparations of the Examples 1-9 and Comparative Examples 1-3 are shown below in Tables 1 and 2.

TABLE 1

| | Layer A: Film Recipe (wt. %) | | | | Layer B: Film Recipe (wt. %) | | | |
|---|---|---|---|---|---|---|---|---|
| Example | PET | PBT | 2.5 μm Silica | Pigment Blend | PET | PBT | 2.5 μm Silica | Pigment Blend |
| Comparative Example 1 | 49.9% | 50% | 0.12% | 0% | 49.9% | 50% | 0.12% | 0% |
| Example 1 | 49.9% | 50% | 0.12% | 0% | 49.8% | 50% | 0.12% | 0.04% |
| Example 2 | 49.9% | 50% | 0.12% | 0% | 49.8% | 50% | 0.12% | 0.08% |
| Example 3 | 49.9% | 50% | 0.12% | 0% | 49.7% | 50% | 0.12% | 0.16% |
| Example 4 | 49.9% | 50% | 0.12% | 0% | 49.6% | 50% | 0.12% | 0.32% |
| Example 5 | 49.9% | 50% | 0.12% | 0% | 49.4% | 50% | 0.12% | 0.48% |
| Example 6 | 49.9% | 50% | 0.12% | 0% | 49.2% | 50% | 0.12% | 0.64% |
| Comparative Example 2 | 39.9% | 60% | 0.12% | 0% | 39.9% | 60% | 0.12% | 0% |
| Example 7 | 39.9% | 60% | 0.12% | 0% | 39.8% | 60% | 0.12% | 0.08% |
| Example 8 | 39.9% | 60% | 0.12% | 0% | 39.7% | 60% | 0.12% | 0.16% |
| Comparative Example 3 | na | na | na | na | 39.9% | 60% | 0.12% | 0% |
| Example 9 | na | na | na | na | 39.7% | 60% | 0.12% | 0.16% |

TABLE 2

| Example | Film Recipe (wt. %) PET | PBT | 2.5 μm Silica | Pigment Blend | Extrusion Residence Time (min.) | Trans-esterification (mol. %) | Trans-esterification rate (mol. %/min.) |
|---|---|---|---|---|---|---|---|
| Comparative Example 1 | 49.9% | 50% | 0.12% | 0% | 4.5 | 1.55 | 0.34 |
| Example 1 | 49.8% | 50% | 0.12% | 0.04% | 4.5 | 1.47 | 0.33 |
| Example 2 | 49.8% | 50% | 0.12% | 0.08% | 4.5 | 0.75 | 0.17 |
| Example 3 | 49.7% | 50% | 0.12% | 0.16% | 4.5 | 0.55 | 0.12 |
| Example 4 | 49.6% | 50% | 0.12% | 0.32% | 4.5 | 0.30 | 0.07 |
| Example 5 | 49.4% | 50% | 0.12% | 0.48% | 4.5 | 0.28 | 0.06 |
| Example 6 | 49.2% | 50% | 0.12% | 0.64% | 4.5 | 0.22 | 0.05 |
| Comparative Example 2 | 39.9% | 60% | 0.12% | 0% | 4.5 | 1.06 | 0.24 |
| Example 7 | 39.8% | 60% | 0.12% | 0.08% | 4.5 | 0.83 | 0.19 |
| Example 8 | 39.7% | 60% | 0.12% | 0.16% | 4.5 | 0.80 | 0.18 |
| Comparative Example 3 | 39.9% | 60% | 0.12% | 0% | 13.6 | 7.19 | 0.53 |
| Example 9 | 39.7% | 60% | 0.12% | 0.16% | 13.6 | 6.48 | 0.48 |

TABLE 3

| Example | Film Differential Scanning Calorimetry (DSC) | | | | |
|---|---|---|---|---|---|
| | PET Melt Temperature (° C.) | PBT Melt Temperature (° C.) | Crystallization Peak (° C.) | Crystallization Integral (° C.) | Peak Width/ Height (° C. · W/g) |
| Comparative Example 1 | 252.1 | 218.2 | 182.5 | 42.9 | 66.3 |
| Example 1 | 252.3 | 219.2 | 187.9 | 41.4 | 69.5 |
| Example 2 | 253.8 | 219.3 | 196.1 | 44.2 | 69.0 |
| Example 3 | 254.2 | 219.8 | 200.2 | 44.4 | 73.6 |
| Example 4 | 254.8 | 221.6 | 204.1 | 44.2 | 97.9 |
| Example 5 | 254.8 | 220.7 | 205.0 | 46.8 | 83.9 |
| Example 6 | 254.9 | 221.2 | 208.4 | 47.8 | 90.7 |
| Comparative Example 2 | 253.2 | 221.3 | 171.9 | 39.1 | 34.3 |
| Example 7 | 253.6 | 221.2 | 184.8 | 39.9 | 13.2 |
| Example 8 | 253.7 | 220.6 | 186.7 | 42.3 | 18.7 |
| Comparative Example 3 | 240.3 | 216.4 | 169.1 | 35.4 | 30.1 |
| Example 9 | 241.8 | 217.5 | 185.4 | 40.5 | 7.3 |

Examples 1-6

Two-layer coextruded and biaxially oriented 12 micron thick films having a nominal 1.5 micron thick skin layer, layer A, comprising 50 wt. % PBT, approximately 50 wt. % PET, and 0.12 wt. % of 2.5 micron silica particles added for COF control; and a coextruded core layer, layer B, directly adjacent and permanently fixed to skin layer A comprising 50 wt. % PBT, approximately 50 wt. % PET, 0.12 wt. % of 2.5 micron silica particles added for COF control, and various levels of pigment ranging from 0.04 wt. % to 0.64 wt. %.

Comparative Example 1

A 2-layer coextruded and biaxially oriented 12 micron thick film having a nominal 1.5 micron thick skin layer, layer A, comprising 50 wt. % PBT, approximately 50 wt. % PET, and 0.12 wt. % of 2.5 micron silica particles added for COF control; and a coextruded core layer, layer B, directly adjacent and permanently fixed to skin layer A comprising 50 wt. % PBT, approximately 50 wt. % PET, 0.12 wt. % of 2.5 micron silica particles added for COF control, and contains no pigment.

Examples 7 and 8

Two-layer coextruded and biaxially oriented 12 micron thick films having a nominal 1.5 micron thick skin layer, layer A, comprising 60 wt. % PBT, approximately 40 wt. % PET, and 0.12 wt. % of 2.5 micron silica particles added for COF control; and a coextruded core layer, layer B, directly adjacent and permanently fixed to skin layer A comprising 60 wt. % PBT, approximately 40 wt. % PET, 0.12 wt. % of 2.5 micron silica particles added for COF control, and various levels of pigment ranging from 0.04 wt. % to 0.64 wt. %.

Comparative Example 2

A coextruded and biaxially oriented 12 micron thick film having a nominal 1.5 micron thick skin layer, layer A, comprising 60 wt. % PBT, approximately 40 wt. % PET, and 0.12 wt. % of 2.5 micron silica particles added for COF control; and a coextruded core layer, layer B, directly adjacent and permanently fixed to skin layer A comprising 60 wt. % PBT, approximately 40 wt. % PET, 0.12 wt. % of 2.5 micron silica particles added for COF control, and contains no pigment.

The A-layers of Examples 1-8 and Comparative Examples 1-2 were manufactured using a 1.25 inch diameter extruder with 24:1 L/D. The B-layers of Examples 1-8 and Comparative Examples 1-2 were manufactured using a 2.5 inch diameter extruder with 30:1 L/D. Total extrusion residence time was less than 5.0 minutes.

Examples 1-8 and Comparative Examples 1-2 were laminated to a 0.0113 inch (0.29 mm) thick tin-free substrate of electrolytic chrome-coated steel at 430° F. (221° C.), so that the core layer (B) was in contact with the steel surface.

Examples 1-8 and Comparative Examples 1-2 were subjected to blush resistance testing in the lab pressure cooker and in the commercial retort as described in the test methods section with the film on the outer side of the container lid. The films maintained excellent adhesion to the steel and maintained a clear appearance with no or very little discoloration.

Example 9

A monolayer, biaxially oriented, 12 micron thick film comprising 60 wt. % PBT, approximately 40 wt. % PET, and 0.12 wt. % of 2.5 micron silica particles added for COF control and 0.16 wt. % pigment. The DSC data shows a PET melt temperature of 241.8° C. and a PBT melt temp of 217.5° C.

Comparative Example 3

A monolayer, biaxially oriented, 12 micron thick film comprising 60 wt. % PBT, approximately 40 wt. % PET, and 0.12 wt. % of 2.5 micron silica particles added for COF control with no pigment added. The DSC data shows a greater decrease in both the PET and PBT melt temperatures compared to Example 9, a direct indication of increased trans-esterification of both the PET and PBT components.

Example 9 and Comparative Example 3 were manufactured using sequential extruders A and B. Extruder A was a 225 mm diameter extruder with a length to diameter ratio of 30. Extruder B was a 225 mm diameter extruder with a length to diameter ratio of 17. Total extrusion residence time was between 15 and 20 minutes. The average temperature in extruder A was approximately 270° C. and the average temperature in extruder B was approximately 252° C. Both Example 9 and Comparative Example 3 show significant decrease in their PET and POBT melt temperatures due to longer extrusion times and higher levels of trans-esterification than Examples 1-8 and Comparative Examples 1-2. The addition of pigment in Example 9, however, demonstrates the effectiveness of limiting trans-esterification in a system where relatively long extrusion times of more than 10 minutes are encountered.

Although specific forms of the invention have been selected in the preceding disclosure for illustration in specific terms for the purpose of describing these forms of the invention fully and amply for one of average skill in the pertinent art, it should be understood that various substitutions and modifications which bring about substantially equivalent or superior results and/or performance are deemed to be within the scope of the following claims. The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

We claim:

1. A biaxially oriented polymeric film comprising:
a base layer comprising from about 35 wt. % to about 80 wt. % of polyester (A), from about 20 wt. % to about 65 wt. % of polyester (B), and from about 0.01 wt. % to about 0.08 wt. % of a pigment compound, the polyester (A) comprising polybutylene terephthalate, the polyester (B) comprising polyethylene terephthalate, the pigment compound containing polar functional groups to assist in minimizing trans-esterification between the polyester (A) and the polyester (B),
wherein the pigment compound includes at least one sulfonate functional group,
wherein the total amount of polyester (A) and polyester (B) is about 99 to 99.99 wt. % of the base layer,
wherein the polymeric film has a haze value of less than about 90% and a thickness of from about 5 μm to about 75 μm.

2. The polymeric film of claim 1, wherein the thickness is from about 8 μm to about 50 μm.

3. The polymeric film of claim 1, wherein the base layer comprises from about 45 wt. % to about 60 wt. % of the polyester (A).

4. The polymeric film of claim 1, wherein the base layer comprises from about 0.02 wt. % to about 0.08 wt. % of the pigment compound.

5. The polymeric film of claim 4, wherein the base layer comprises from about 0.04 wt. % to about 0.08 wt. % of the pigment compound.

6. The polymeric film of claim 1, wherein the total amount of polyester (A) and polyester (B) is about 99 wt. % of the base layer.

7. The polymeric film of claim 1 further including at least one skin layer being adjacent and directly in contact with the base layer, the at least one skin layer comprising from about 35 wt. % to about 80 wt. % of polyester (C), and from about 20 wt. % to about 65 wt. % of polyester (D), the polyester (C) comprising polybutylene terephthalate, the polyester (D) comprising polyethylene terephthalate.

* * * * *